United States Patent [19]

Julian

[11] Patent Number: 4,563,403

[45] Date of Patent: Jan. 7, 1986

[54] ELECTROLYTE FOR ELECTRO-CHEMICAL CELLS

[76] Inventor: John D. Julian, Flötzersteig 203, Vienna A-1140, Austria

[21] Appl. No.: 583,100

[22] Filed: Feb. 23, 1984

Related U.S. Application Data

[63] Continuation-in-part of Ser. No. 286,572, Jul. 24, 1981, abandoned.

[51] Int. Cl.$^4$ .............................................. H01M 10/26
[52] U.S. Cl. ................................... 429/198; 429/207; 429/216
[58] Field of Search ............... 429/107, 198, 206, 207, 429/198, 199, 200, 188, 216

[56] References Cited

U.S. PATENT DOCUMENTS

| | | | |
|---|---|---|---|
| 3,185,580 | 5/1965 | Mayer et al. | 429/199 |
| 3,440,099 | 4/1969 | Okinaka | 429/207 |
| 3,905,833 | 9/1975 | Louzos | 429/207 |
| 3,953,302 | 4/1976 | Rao et al. | 429/216 |
| 4,180,623 | 12/1979 | Adams | 429/107 |
| 4,247,610 | 1/1981 | Thornton | 429/199 |
| 4,268,589 | 5/1981 | Tamminen | 429/199 |

FOREIGN PATENT DOCUMENTS

| | | | |
|---|---|---|---|
| 0045245 | 4/1975 | Japan | 429/207 |

*Primary Examiner*—Donald L. Walton
*Attorney, Agent, or Firm*—Kurt Kelman

[57] ABSTRACT

An electrolyte is disclosed which can be used in a variety of electrochemical cells and rechargeable accumulators. The electrolyte solution contains a complexing agent which reduces electrode solubility, combats dendrite formation, improves electrolyte conductivity and low temperature operation. The complexing agent additive described can be used with various electrolytes and existing cell types to advantage. Aspects of this invention are applicable to Ni-Cd, Ag-Cd, Ag-Zn, Ni-Fe, Ni-Zn, and like cells.

9 Claims, No Drawings

ELECTROLYTE FOR ELECTRO-CHEMICAL CELLS

This application is a continuation in part application of copending U.S. patent application Ser. No. 286,572 filed July 24, 1981, now abandoned.

The invention relates to an electrolyte for use in electrochemical cells, current producing cells or electrical accumulators of various types comprising active electrodes and dilute electrolytes. The electrolyte contains a complexing agent which reduces electrode solubility and improves electrolyte conductance.

In the continuing search for improved power sources considerable work has been done in investigating means for improving the performance of various electrochemical cells and storage batteries particularly in respect of size, weight and capacity. Important applications for these are in such fields as hearing aids, portable equipment, space and satellite applications and ultimately electrically driven non-polluting vehicles. One aspect of this work has naturally been to investigate also the electrolyte used in such cells. Factors of interest here are conductance, current carrying capacity, corrosion effects on electrodes and other cell parts, etc. These factors vary with the concentration of the electrolyte, temperature, solubility of the electrodes and additives. Other important considerations are rate of chemical reaction, charge transfer and, in the case of many rechargeable cells, such problems as dendrite growth, deterioration of electrode structure, loss of capacity and resultant short serviceable life.

Various additives have been tested in electrochemical cells of different types and inorganic as well as organic additives as sometimes also used in the electroplating industry have been tried so as to combat dendrite growth, improve charge transfer and reduce internal resistance or to generally improve cell performance and life.

Additives have also been added to electrode structures to help reduce loss of capacity, electrode poisoning effects or to improve electrolyte penetration further into the electrode structure to better utilise the available material.

For the main part the modifications and additives so far used and proposed have not shown adequate long term stability on continued recycling use in electrochemical cells as they tend to be oxidised, rejected or react irreversibly with the electrode or other cell parts or are dissipated and lose their efficacity. The present invention solves many of the previously mentioned problems and, dependent upon the cell type, electrode structure and construction in which the electrolyte is used, such a cell is improved in efficiency, performance and economic desireability.

In accordance with the invention it has been discovered that an electrochemical cell, a current producing cell or an accumulator with electrodes comprising active materials and a conventional dilute electrolyte is improved when said dilute electrolyte contains as additive a solution of potassium or sodium ferro- or ferricyanide.

At least one polarity of electrode may also contain a cyanide or a ferro- or ferricyanide. The metallic (Fe) link retains the (CN) and avoids loss during recycling. The (Fe(CN) complex actually takes part in charge transfer, improving electrolyte conductivity and lowering cell internal resistance. By electrodes comprising active materials is meant that the electrodes themselves comprise active material which takes part in the charge-discharge mechanism of the cell, such as e.g. $Ni(OH)_2$, $Cd(OH)_2$ and AgO.

The dilute potassium ferro- or ferricyanide additive remains well below the saturation point e.g. and is present in the amount of 4 g/100 ml of electrolyte.

According to the present invention there is provided a dilute additive to an electrolyte for electrochemical cells, current producing cells or accumulators using dilute alkaline, weak acidic, neutral or organic electrolytes, comprising complexing iron cyanide as an ion conductivity improving and electrode solubility reducing additive, said additive consisting of potassium or sodium-ferro or ferricyanide. Ferro- or ferricyanide has in the past been used in supersaturated form as an active cathode redox material. In such saturated or supersaturated form, however, ferro or ferricyanide reduces the conductivity of the electrolyte and it forms crystals and solidifies at ambient temperatures. These undesirable effects preclude its use therefore in concentrated or saturated form in conventional cells, as the normal active materials of the electrodes of such cells would be blocked and could not function properly.

It is a feature of the present invention to use potassium or sodium-ferro or ferricyanide as an additive to conventional dilute electrolyte in small amount, where the benefits of increased conductivity of the electrolyte, reduced solubility of electrode active materials, and active material utilisation are all enhanced.

The chemical reactions during charge and discharge of various electrochemical cells are not fully known and there are often a number of competing reaction schemes taking part. To one skilled in the art of electrochemical cell reactions, be it as applied to electroplating or to electrical or rechargeable cells, it is not essential to fully understand all details of the reactions taking part to make use of the invention. The reactions taking place in a given electrochemical cell combination or electrolyte additive of this invention should not in any way be construed as defining or limiting the invention.

The electrolyte additive of this invention is particularly advantageous in precharged dry stored high capacity cells and rechargeable cells such as Silver-Zinc (Ag-Zn), Nickel-Cadmium (Ni-Cd), Nickel-Zinc (Ni-Zn), Nickel-Iron (Ni-Fe) and Lead Oxide (PbO). The electrolyte comprises potassium or sodium ferro- or ferricyanide as an additive in dilute form to a dilute electrolyte for electrochemical cells, current producing cells or accumulators. In certain cases, particularly in rechargeable cells with zinc electrodes, an additional small addition of a suitable fluoride NaF or KF is also advantageous.

The constituent parts of the electrolyte and the optional initial additive of fluoride in suitable form can in accordance with this invention equally well be used in cells having different electrolytes as also for the formation and activation of various electrodes prior to assembly into a cell as also for certain electroplating and electrochemical surface treatment processes. The electrolyte additive of this invention provides improved conductivity, particularly at low temperatures reducing cell internal resistance. Acting as a charge transfer medium, it increases cell potential and improves cell stored capacity and efficiency by better utilisation of the electrode electrochemical capacity. In the case of rechargeable cells it will in addition combat dendrite formation by attenuation of electrode solubility and alteration of electrode conditions. In cells of the Silver-Zinc type cell degradation due to Ag migration to the zinc electrode is also greatly attenuated and recycling life considerably extended even without recourse to special separators.

Dependent upon cell type electrodes and electrolyte composition, a reduction of the electrode solubility occurs, which reduces or eliminates effects such as shape change, loss of electrode capacity, dendrite growth, improves active material utilisation and cell performance generally.

Thus this invention provides the following improvements in electrochemical cells as indicated:
(1) Lower internal cell resistance.
(2) Better low temperature performance
(3) Higher output potential.
(4) Better efficiency.
(5) Better utilisation of electrode material.
(6) Combatting of dendrite formation.
(7) Longer Cell life.

An electrolyte with additive of this invention can be prepared as follows: Potassium hydroxide (KOH) solution is prepared to a density of 1,12 g/ml 20° C. (2,6 molar or 13 wt%) potassium ferricyanide ($K_3Fe(CN)_6$) is then added till a density of 1,14 to 1,2 g/ml is attained. Alternatively 15 grams of (KOH) granules 85%KOH and 4 grams of potassium ferricyanide ($K_3Fe(CN)_6$) can be dissolved per 100 ml of distilled water. The absolute ratios are not at all critical and in many cases even a very small amount of potassium ferricyanide added to an existing electrolyte is sufficient to improve performance considerably.

The electrolyte density used in various types of cells differs widely and is chosen to suit the particular operating temperature and conditions as well as the cell components and electrodes concerned. The criteria for the choice of electrolyte composition or electrolyte additive used as per this invention by any manufacturer for a given application or set of conditions may likewise vary and could well fall outside the preferred range here indicated as a guide. This in no way detracts from the value of the invention or the benefits claimed herein.

EXAMPLES

1. In accordance with one aspect of this invention a normal Silver-Zinc (Ag-Zn) pre-charged dry stored cell is supplied with the electrolyte containing the additive of this invention consisting of potassium hydroxide (KOH) solution of density 1,12 g/ml 20° C. to which is added potassium ferricyanide ($K_3Fe(CN)_6$) till a density of 1,14 g/ml is attained. The cell will provide a higher output have a lower internal resistance, give better efficiency and capacity.

2. In accordance with a further aspect of this invention a normal cell of the Nickel-Cadmium (Ni-Cd) type is provided with the electrolyte prepared as in example 1 above instead of its more conventional electrolyte of KOH or NaOH. The cell will similarly provide improved characteristics as well as a higher output level than usual for conventional cells. The extent of other improvements will depend upon details of the electrode and cell construction.

3. In accordance with a further aspect of this invention a cell of the normal Nickel Iron (Ni-Fe) type is likewise improved by the use of the electrolyte with additive of this invention.

4. In accordance with a further aspect of this invention a cell of the Nickel-Zinc (Ni-Zn) type is similarly improved by the use of the electrolyte with additive of this invention.

5. In accordance with a further aspect of this invention a cell of the Nickel-Zinc (Ni-Zn) rechargeable type using the electrolyte with additive of this invention will also have a very little fluoride KR or NaF and boron in the form of $Na_2B_4O_7$, $K_3BO_3$ or orthoboric acid $H_3BO_3$ added to the electrolyte.

In a preferred embodiment of this invention the electrolyte with additive of this invention is used in a Nickel-Cadmium (Ni-Cd) rechargeable cell of normal construction the electrode structure of which can be of the pocket or the sintered or other type and with suitable separators. The electrolyte being made up as previously described of potassium hydroxide KOH to a density of 1,12 g/ml to which is added potassium ferricyanide ($K_3Fe(CN)_6$) to increase the density to around 1,14 to 1,18 g/ml. The absolute ratios are not at all critical as even a very small amount of ($K_3Fe(CN)_6$) added to an electrolyte is sufficient to considerably improve performance.

In an other preferred embodiment of the invention the electrolyte with additive is used in a Nickel-Zinc (Ni-Zn) cell of normal construction and can be composed as in the previous preferred embodiment of KOH solution to 1,12 g/ml to which is added potassium ferricyanide to bring the density to 1,14 to 1,18 g/ml. In the case of Zinc based electrodes in rechargeable cells, it has been found beneficial to add a small amount of potassium fluoride or sodium fluoride KF or NaF and boron in the form of $Na_2B_4O_7$, $K_3BO_2$ or orthoboric acid $H_3BO_3$ so as to further arrest the solubility of the Zinc electrode.

The following are comparative test results using electrolyte containing potassium or sodium ferro- or ferricyanide, referred to below as "Julian" electrolyte in various types of normal rechargeable cells.

Standard commercial rechargeable cells, as available on the European market were obtained, and comparisons made, in their performance with their normal manufacturers recommended KOH electrolyte and with the "Julian" electrolyte.

The cell types tested were:
(1) Ni-Cd pocket plate vented cells.
(2) Ni-Cd Sintered plate vented cells.
(3) Ag-Cd Vented cells.
(4) Ag-Zn Vented cells.

| (1) Ni-Cd Pocket plate vented cells. | | | |
|---|---|---|---|
| | Manufacturers normal KOH recommended electrolyte. | | "Julian" electrolyte |
| Cell -A- Ambient Temp. +20° C. | Manufacturers rated capacity. | 24 Ah. | |
| | Measured capacity to 1.0 V at 5 Hours rate. | 23 Ah. | 29.44 Ah. |
| | Mid-point potential. | 1.22 V. | 1.24 V. |
| | Internal cell resistance. | 3.15 mOhm. | 2.6 mOhm. |
| Low Temp. −20° C. | Heavy (cranking) discharge at −20° C. to 0.6 V. | 30 mins | 35 mins, slightly higher output V. |
| | Return to ambient temp. residual capacity. | — | some 15% more. |
| Cell -B- Ambient Temp. +20° C. | Manufacturers rated capacity. | 24 Ah. | |
| | Measured capacity to 1.0 V at 5 Hours rate. | 24.2 Ah. | 31.4 Ah. |
| | Mid-point potential. | 1.22 V. | 1.235 V. |
| | Internal cell resistance. | 3.1 mOhm. | 2.6 mOhm. |
| Low | Heavy (cranking) dis- | 31 mins. | 36 mins, |

-continued

(1) Ni-Cd Pocket plate vented cells.

| | Manufacturers normal KOH recommended electrolyte. | "Julian" electrolyte |
|---|---|---|
| Temp. −20° C. | charge at −20° C. to 0.6 V. | higher output V. |
| | Return to ambient temp. residual capacity. | — some 18% more. |

(2) Ni-Cd Sintered plate vented cells.

| | | Manufacturers normal KOH recommended electrolyte. | "Julian" electrolyte. |
|---|---|---|---|
| Cell -C- Ambient Temp. +20° C. | Manufacturers rated capacity | 4. Ah. | |
| | Measured capacity to 1.0 V at 5 Hrs rate. | 4.1 Ah. | 5.4 Ah. |
| | Mid-point potential | 1.24 V | 1.25 V |
| | Internal cell resistance. | 12 m Ohm. | 9.84 m Ohm. |
| | Measured capacity to 1.0 V at 2 Hrs rate. | 3.28 Ah. | 4.26 Ah. |
| | Mid-point potential. | 1.21 V | 1.22 V. |
| Cell -D- Ambient Temp. +20° C. | Manufacturers rated capacity | 6. Ah. | |
| | Measured capacity to 1.0 V at 5 Hrs rate. | 5.9 Ah | 7.61 Ah. |
| | Mid-point potential. | 1.24 V | 1.25 V |
| | Internal cell resistance. | 8. m Ohm. | 6.8 m Ohm. |
| | Measured capacity to 1.0 V at 2 Hrs rate. | 4.84 Ah. | 6.21 Ah. |
| | Mid-point potential. | 1.22 V. | 1.23 V. |

(3) Ag-Cd cells. Nominal capacity 3 Ah.

Four commercial Ag-Cd cells were obtained and tested under manufacturers specified conditions to measure actual capacity. two of the cells were then cycled to failure, these cells had the original manufacturers recommended electrolyte, cycles to failure were noted. The other two cells were then refilled with "Julian" electrolyte and likewise cycled, these cells continued operating satisfactorily well after the manufacturers specified normal life cycles for these cells, results are summarized below:

| | Normal KOH electrolyte. | | "Julian" electrolyte. | | Deep discharge cycles. |
|---|---|---|---|---|---|
| | Capacity 5 hr rate. | Capacity 2 hr rate. | Capacity 5 hr rate. | Capacity 2 hr rate. | |
| cell 2. | 3.1 Ah. | 2.635 Ah. | — | — | Failed, 180 cycles. |
| cell 3. | 3.3 Ah. | 2.772 Ah. | — | — | Failed, 252 cycles. |
| cell 1. | 3.2 Ah. | 2.704 Ah. | 4.06 Ah. | 3.45 Ah. | Both cells completed 350 cycles, still O.K. |
| cell 4. | 3.25 Ah. | 2.762 Ah. | 4.29 Ah. | 3.53 Ah. | |

(4) Ag—Zn cells. Nominal capacity 2 Ah.

Similarly four Ag—Zn cells were obtained and compared with normal and "Julian" electrolytes for capacity and cycling life.

| | Standard electrolyte | "Julian" electrolyte. | Deep discharge cycles. |
|---|---|---|---|
| Cell 1. | 2.9 Ah. | — | Failed after 102 cycles. |
| Cell 2. | 2.3 Ah. | — | Failed after 68 cycles. |
| Cell 3. | 2.8 Ah. | 3.78 Ah. | Both cells 3 and 4 completed 260 cycles and are still O.K. |
| Cell 4. | 2.2 Ah. | 3.03 Ah. | |

The electrolyte containing a dilute solution of potassium or sodium ferro- or ferricyanide is in no way limited to use with above examples and can also be used with other electrode systems and additives. Such additives are often used to modify electrode conductivity or overpotential or to reduce gassing and self discharge etc., some such examples being graphite, carbon, Ni, Pb, Mn, Mo, V, Ti, Zr, Hf, Nb, Hg, etc. When using this electrolyte some such additives can to advantage be added in the form of a cyanide or ferricyanide such as potassiumcyanomercurate ($K_2Hg(CN)_4$).

The principles, preferred embodiments, examples, various advantages and improvements obtained from the use of the present invention have been described in the foregoing specification. The invention which is to be protected herein is however not to be construed as limited to the particular examples of its use described or disclosed as these are to be regarded only as illustrative rather than restrictive. Variations and changes may well be made by those skilled in the art without in any way departing from the spirit of the invention.

What is claimed is:

1. In a current producing cell or an accumulator with electrodes comprising active materials and a single dilute aqueous electrolyte conducting ions between the electrodes, wherein the improvement comprises up to 4 grams, per 100 ml of the dilute electrolyte, of a potassium or sodium ferro- or ferricyanide additive increasing the ion conductivity of the electrolyte and reducing the electrode solubility.

2. In the current producing cell or accumulator of claim 1, wherein the electrolyte is alkaline.

3. In the current producing cell or accumulator of claim 1, wherein the electrolyte contains potassium or sodium hydroxide.

4. In the current producing cell or accumulator of claim 1, wherein at least one polarity of electrode contains a cyanide or ferro- or ferricyanide compound.

5. In the current producing cell or accumulator of claim 1, wherein the electrolyte further contains a fluoride.

6. In the current producing cell or accumulator of claim 1, wherein the electrolyte further contains a borate or orthoboric acid.

7. In the current producing cell or accumulator of claim 1, wherein the cell is a silver-cadmium of silver-zinc cell.

8. In the current producing cell or accumulator of claim 1, wherein the cell is a nickel-cadmium, nickel-iron or nickel-zinc-cell.

9. In the current producing cell or accumulator of claim 1, wherein the electrolyte further contains potassium cyanomercurate.

* * * * *